United States Patent [19]

Erikson et al.

[11] 4,009,307
[45] Feb. 22, 1977

[54] POLYUREA-URETHANE COATINGS

[75] Inventors: J. Alden Erikson; Ken W. Niederst, both of Gibsonia, Pa.

[73] Assignee: PPG Industries, Inc., Pittsburgh, Pa.

[22] Filed: July 24, 1975

[21] Appl. No.: 599,242

[52] U.S. Cl. .................. 427/377; 260/77.5 AM; 260/77.5 CH; 427/388 R; 427/393
[51] Int. Cl.² ................................... B05D 3/02
[58] Field of Search .......... 260/77.5 AM, 77.5 CH; 427/388, 393, 377

[56] References Cited

UNITED STATES PATENTS

| | | | |
|---|---|---|---|
| 3,539,424 | 11/1970 | Tashlick | 260/77.5 X |
| 3,560,246 | 2/1971 | Payne et al. | 427/393 |
| 3,793,417 | 2/1974 | Erikson et al. | 260/77.5 AM |

*Primary Examiner*—Lewis T. Jacobs
*Attorney, Agent, or Firm*—Frank J. Troy

[57] ABSTRACT

Coating compositions which form polyurea-urethane coatings having excellent chemical and physical properties are prepared by blending (a) from about 2 percent to about 80 percent by weight of resin solids of an isocyanate-terminated polyurethane prepolymer consisting essentially of the reaction product of an organic diisocyanate and an organic diol, wherein said prepolymer is prepared at an NCO/OH ratio of from 2:1 to about 4:3, (b) from about 2 percent to about 60 percent by weight resin solids of an isocyanate-terminated polyurethane prepolymer consisting essentially of the reaction product of 1-isocyanato-3-isocyanatomethyl-3,5,5-trimethylcyclohexane and a mixture of aliphatic polyols wherein at least about 30 mole percent of the total hydroxyl groups supplied by said mixture of polyols is supplied by an aliphatic polyol having at least three hydroxyl groups and wherein said prepolymer is prepared at an NCO/OH ratio of at least 1.2:1; and (c) from about 20 percent to about 50 percent by weight of resin solids of a polyketimine material consisting essentially of the reaction product of a diketimine compound having the general formula:

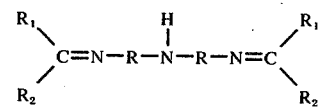

wherein R is an alkylene group of 2 to 6 carbon atoms and $R_1$ and $R_2$ are hydrogen or organic radicals having from 1 to 8 carbon atoms, and a polyisocyanate material selected from the group consisting of an isocyanate-terminated polyurethane prepolymer formed by reacting an organic diisocyanate and an organic diol at an NCO/OH ratio of from about 2:1 to about 4:3 or mixtures of isocyanate-terminated prepolymers and unreacted diisocyanate formed by reacting an organic diisocyanate and an organic diol at an NCO/OH ratio of from about 3:1 to about 5:1, wherein a sufficient amount of said diketimine is reacted with said polyisocyanate compound to produce a polyketimine compound containing essentially no free NCO groups.

The polyurea-urethane coatings formed from the compositions of the invention have excellent chemical and physical properties and are particularly useful as coatings for wood.

28 Claims, No Drawings

POLYUREA-URETHANE COATINGS

BACKGROUND OF THE INVENTION

Polyurea coatings are highly desirable for many applications because of their excellent durability. One application in which such coatings are particularly desirable because of their durability is in the prefinishing of wood millwork such as window sills and the like. In these applications, the coatings utilized are subject to stringent requirements such as, for example, the ability to resist chalking, cracking, blistering and peel-off for periods of time ranging up to as long as 10 years. A number of such polyurea coatings meeting these requirements are presently available. However, the presently available polyurea coatings have several serious disadvantages such as extremely high materials cost, a tendency to yellowing and in some cases exhibit poor curing or drying characteristics over preservative-treated surfaces when the preservative is not completely dry. Accordingly, a need exists for wood coatings which do not exhibit these disadvantages. The disadvantages of these prior coatings are substantially overcome by the present invention. Thus, the present invention is for coating compositions which form polyurea-urethane coatings having essentially all of the excellent properties of the prior polyurea coatings including outstanding durability but which are much more economical, do not yellow and will cure or dry even when applied over preservative-treated surfaces in which the preservative is not completely dry.

DESCRIPTION OF THE INVENTION

As indicated, the novel coating compositions of this invention are composed of three essential components, i.e., (1) from about 2 percent to about 80 percent by weight of resin solids of an isocyanate-terminated polyurethane prepolymer consisting essentially of the reaction product of an organic diisocyanate and an organic diol, wherein said prepolymer is prepared at an NCO/OH ratio of from about 2:1 to about 4:3, (2) from about 2 percent to about 60 percent by weight of resin solids of an isocyanate-terminated polyurethane prepolymer consisting essentially of the reaction product of 1-isocyanato-2-isocyanatomethyl-3,5,5-trimethylcyclohexane and a mixture of aliphatic polyols wherein at least about 30 mole percent of the total hydroxyl groups supplied by said mixture of polyols is supplied by an aliphatic polyol having at least 3 hydroxyl groups and wherein said prepolymer is prepared at an NCO/OH ratio of at least 1.2:1; and (3) from about 20 percent to about 50 percent by weight of resin solids of a polyketimine material consisting essentially of the reaction product of a diketimine compound having the general formula:

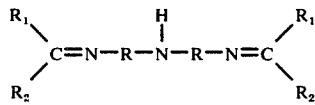

wherein R is an alkylene group of 2 to 6 carbon atoms and $R_1$ and $R_2$ are hydrogen or organic radicals having from 1 to 8 carbon atoms, and a polyisocyanate material selected from the group consisting of an isocyanate-terminated polyurethane prepolymer formed by reacting an organic diisocyanate and an organic diol at an NCO/OH ratio of from about 2:1 to about 4:3 or mixtures of isocyanate-terminated prepolymers and unreacted diisocyanate formed by reacting an organic diisocyanate and an organic diol at an NCO/OH ratio of from about 3:1 to about 5:1, wherein a sufficient amount of said diketimine is reacted with said polyisocyanate material to produce a polyketimine material containing no free NCO groups.

As indicated, the first essential component (1) of the compositions of the invention is an isocyanate-terminated prepolymer consisting essentially of the reaction product of an organic diisocyanate and an organic diol, said prepolymer being prepared at an NCO/OH ratio of from about 2:1 to about 4:3.

The diisocyanate which is reacted with the diol may be essentially any organic diisocyanate, such as a hydrocarbon diisocyanate or substituted hydrocarbon diisocyanate, an aromatic, aliphatic or cycloaliphatic diisocyanate or a combination of these types. Representative compounds include 2,4-toluene diisocyanate, isophorone diisocyanate, p-phenylene diisocyanate, 4-chloro-1,3-phenylene diisocyanate, 4,4'-diphenylene diisocyanate, 1,10-decylmethylene diisocyanate, 1,4-cyclohexylene diisocyanate, 4,4'-methylene bis(cyclohexyl diisocyanate) and 1,5-tetrahydronaphthalene diisocyanate. Compounds in which the two isocyanate groups differ in reactivity such as 2,4-toluene diisocyanate and isophorone diisocyanate are particularly desirable because they result in products or intermediates with very low free monomer content. The diisocyanate may contain other substituents, although those which are free from reactive groups other than the two isocyanate groups are ordinarily preferred. In the case of aromatic compounds, the isocyanate groups may be attached either to the same or to different rings.

Most diisocyanates generally have the formula $OCNR_1NCO$ wherein $R_1$ is selected from the group consisting of arylene, such as p-phenylene diphenylene and the like; alkarylene, such as toluene diphenylene and the like; alkylene such as tetramethylene, hexamethylene, trimethylhexylene and the like; aralkylene such as methyl bisphenyl, dimethylmethylene bisphenyl; arylcycloalkyl, such as arylcyclohexyl; and alicyclic such as isophorone, methylcyclohexylene and the like.

The preferred diisocyanates employed in this prepolymer are isophorone diisocyanate and 2,4-toluene diisocyanate.

The prepolymer constituting the first component of the compositions of the invention is formed by reacting in known manner the above-described diisocyanates with an organic diol. Suitable diols which may be employed include polyester diols, polyether diols or mixtures thereof.

Polyester diols which may be used in forming the prepolymer can be prepared by the polyesterification of organic dicarboxylic acids or anhydrides thereof with organic diols. Diols which may be employed in making the polyester include alkylene glycols such as ethylene glycol, propylene glycol, butylene glycol, hexylene glycol and neopentyl glycol and other glycols such as hydrogenated Bisphenol A, cyclohexane dimethanol, caprolactone diol (for example the reaction product of caprolactone and ethylene glycol), hydroxyalkylated bisphenols, and polyether glycols such as poly(oxytetramethylene)glycol and the like. In addition, many other diols of various types can be utilized. Dicarboxylic acids which may be used in forming the polyester diol are primarily monomeric dicarboxylic acids having 2 to 14 carbon atoms per molecule. Illustrative of such acids are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, and other dicarboxylic acids of various types (where acids are referred to above, it is understood that the anhydrides of those acids which form anhydrides can be used in place of the acid). Polyester diols which may be used also include polyesteramide diols and dihydric compounds having polyester structures but not formed from the reaction of a diol and a diacid. Examples of these latter type compounds include the so-called lactone polyesters, such as the polycaprolactone diols described in U.S. Pat. No. 3,169,945 to Hostettler et al.

The preferred polyester diols for use in preparing this prepolymer component are the polycaprolactone diols described in the aforementioned patent. A particularly preferred polyester diol for use in preparing the prepolymer is a polycaprolactone diol having a molecular weight of about 530 prepared by reacting 1.0 mole of diethylene glycol with 3.7 moles of epsilon caprolactone, available commercially from the Union Carbide Company under the name Niax PCP-0200.

Polyether diols can also be employed in preparing the prepolymer. Any suitable polyalkylene ether diol may be used, including those which have the following structural formula:

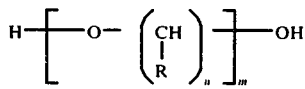

where R is hydrogen or lower alkyl and $n$ is typically from 2 to 6 and $m$ is from 2 to 100 or even higher. Included are poly(oxytetramethylene)glycols, poly(oxyethylene)glycols, poly(oxytrimethylene)glycols, poly(oxypentamethylene)glycols, polypropylene glycols, etc. Also useful are polyether polyols formed from the oxyalkylation of various polyols, for example, glycols such as ethylene glycol, 1,6-hexanediol and the like.

As mentioned above, the isocyanato-terminated prepolymer employed as the first component of the compositions of the invention is essentially made by reacting an excess of the above-described diisocyanates with the above-described polyester polyester diols, polyether diols or mixtures of such diols. The prepolymer prior to curing, which takes place after application of the composition as a coating, is essentially in a liquid state, either as the prepolymer per se or dissolved in a solvent. The uncured prepolymer is generally stable in the sense that the prepolymer will not cure to a solid unless it is further contacted with water, a polyol or other active hydrogen-containing material.

The prepolymer-forming reaction mixture may contain a ratio of total isocyanate groups to total hydroxyl radicals ranging from about 2:1 to about 4:3, preferably 3:2. The prepolymer can be made by simultaneous reaction of excess diisocyanate with the diols. Alternatively, the diisocyanate can be reacted with part or all of one or more of the diols prior to the reaction with the remaining portion of these materials. Stepwise mixing of the diisocyanate with the diols may be used to enhance temperature control. The reaction temperature for making the prepolymer may range from 0° to 150° C. with about 20° C. to 100° C. being preferred and the reaction is preferably continued until there is essentially little, if any, unreacted hydroxyl functionality remaining.

The prepolymer employed as the first component of the compositions of the invention is ordinarily prepared in the presence of an essentially inert solvent. The solvent serves to insure that the reactants are in the liquid state and the solvent permits better temperature control during the reaction by serving as a heat sink and, if desired, as a refluxing medium. Various solvents, including mixtures of such materials, may be employed and among the useful organic solvents are the aliphatic and aromatic hydrocarbons, esters, ethers, keto-esters, ketones glycol-ether-esters, chlorinated hydrocarbons and the like and mixtures thereof. Illustrative of such solvents which are suitable are toluene, xylene, 2-ethoxyethyl acetate, cellosolve acetate, methyl ethyl ketone, methyl isobutyl ketone, dimethyl formamide, dioxane,etc., and their mixtures. The amount of solvent employed may be selected in order to provide a reaction product of film application viscosity but products of greater viscosity may be cut back before use. Often about 0.25 to 6 weights of solvent per weight of total isocyanate and diol are used.

The above described prepolymer may constitute from about 2 percent to about 80 percent, preferably from 60 to 70 percent, by weight of resin solids in the coating composition.

The second essential component (2) of the compositions of the invention is an isocyanate-terminated polyurethane prepolymer which is of different composition than the above-described first prepolymer. The use of two different prepolymers in the composition of the invention is advantageous in that it provides an essential tool for modifying the properties of films formed from the compositions. As indicated above, this second prepolymer is essentially made by the reaction of 1-isocyanato-3-isocyanatomethyl-3,5,5-trimethylcyclohexane with a mixture of aliphatic polyols with said prepolymer being made at an NCO/OH ratio of at least 1.2:1 and wherein at least about 30 mole percent of the total hydroxyl groups supplied by said mixture of polyols is supplied by an aliphatic polyol having at least three hydroxyl groups.

A polyurethane prepolymer derived from the specific diisocyanate and mixture of aliphatic polyols referred to above is of particular advantage in the compositions of the invention in that it is resistant to gelation and imparts to films formed from the compositions outstanding resistance to the degradation and yellowing action of ultraviolet light and outstanding abrasion resistance as well as other desirable properties.

As indicated, the urethane prepolymer of this second component is essentially made by reaction of 1-isocyanato-3-isocyanatomethyl-3,5,5-trimethylcyclohexane with the mixture of urethane-forming aliphatic polyols, and the urethane prior to curing, which takes place after application of the composition, are in the essentially liquid state either as the prepolymer per se or dissolved in a solvent. The uncured prepolymer is generally stable in the sense that the prepolymer will not cure to a solid unless further contacted with water, aliphatic polyol or other active hydrogen containing material. This prepolymer can have a free isocyanate group content of about 3 to 25 or even 35 or more weight percent based on polymer content or solids.

The prepolymer-forming mixture contains a ratio of total isocyanate groups to total hydroxyl radicals of at least 1.2:1, often up to about 3.5:1 or more. Increases in the ratio give coatings of greater film hardness and mar resistance while flexibility and impact resistance may be adversely affected. Also, larger amounts of free isocyanate groups increase the toxicity of the compositions. The free isocyanate group content in the prepolymer is often from about 3 to 12 weight percent, with about 5 to 10 percent being common, based on polymer content or solids.

Aside from the specific diisocyanate employed, the other component used in making the prepolymer of this component is, as noted, a mixture of aliphatic polyols in which at least about 30 mole percent of the total hydroxyl groups supplied by the mixture is supplied by an aliphatic polyol having at least three hydroxyl groups. This mixture of aliphatic polyols can be, for instance, a mixture of diols, triols or other polyols, including the ester and ether polyols. The preferred mixtures of aliphatic polyols for use in forming this second prepolymer component are mixtures of diols and triols. The polyols may be selected from a wide variety of polyhydroxyl materials which may be aliphatic, including cycloaliphatic, hydrocarbon compounds, including substituted hydrocarbon compounds. A minor amount of aromatic polyols or phenols may, if desired, be included in this polyurethane prepolymer but these can lead to unsatisfactory results. These polyols may often have molecular weights up to about 5000 or more, but preferably have molecular weights of up to about 3000.

The aliphatic polyols employed in making the polyurethane-type prepolymer of this second component may be a mixture of polyhydric alkanols which may be the only polyols used or other polyols may also be employed. The aliphatic alcohols have at least 2 carbon atoms, and among the wide variety of such materials which can be used are those represented by the formula:

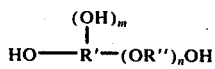

in which R' is an aliphatic hydrocarbon radical, preferably saturated, and R'' is an alkylene radical of 2 to 4, preferably 2 to 3 carbon atoms, R' preferably has 2 to 12, advantageously 2 to 6 carbon atoms. The letter $n$ represents a number from 0 to 50, preferably 2 to 30 or even about 5 to 30, for more flexible coatings, while the letters $m$ is 0 to 2 or more. When $n$ is other than 0, R' may often be the same as R''. Also $n$ may be a number which gives a polyol of desired molecular weight for making the prepolymer. The aliphatic alcohol reactant can be substituted with non-deleterious substituents and the lower molecular weight polyether glycols, e.g., of 2 to 4 ethylene oxide units, are preferred reactant materials.

Suitable aliphatic alcohols include the polyether glycols of up to about 5000 or more molecular weight, such as the polyethylene glycols, for instance, of up to about 3000 molecular weight, propylene glycol, polypropylene glycols, for instance, of up to 3000 molecular weight, ethylene glycol, neopentyl glycol, glycerol, polybutylene glycols, trimethylolpropane, butane diols, trimethylolethane, 1,6-hexamethylene glycol, 1,2,6-hexanetriol, sucrose, sorbitol, etc.

Other polyols which may be employed include the hydroxy esters such as castor oil, polyol-modified castor oils, other polyol-modified non-drying oils and hydroxy-terminated polyesters. The hydroxy-terminated polyester materials are generally made by reaction of one or more aliphatic polyhydroxyalcohols, such as the aliphatic polyols mentioned above, with one or more aliphatic, including cycloaliphatic, or aromatic polycarboxylic acids or esters, and such polyesters may have hydroxyl values in the range of about 25 to 150. Frequently in these polyesters, the polyhydroxy alcohols are predominantly diols and the acids are dicarboxylic acids, including their anhydrides, and preferably contain from 4 to 50 carbon atoms, e.g., phthalic acid, adipic acid, sebacic acid, dimers of olefinically-unsaturated monocarboxylic acids, such as linoleic acid dimer, etc. Modified castor oil partial esters can be made by ester interchange of the oil with polyols such as low molecular weight polyols, including glycols, glycerine, pentaerythritol, etc.

As indicated, the prepolymer of this second component of the compositions of the invention is a prepolymer in which at least a portion (i.e., 30 mole percent) of the polyol reactant mixture is an aliphatic polyol having at least three hydroxyl groups per molecule such as those mentioned before, including the polyols of the defined formula where $m$ is 1 to 2, trimethylol propane, trimethylol ethane, 1,2,6-hexanetriol, sucrose, sorbitol, etc. A preferred mixture of aliphatic polyols employed in preparing the prepolymer of this second component is a mixture of trimethylol propane and neopentyl glycol.

Polyurethane-type prepolymer reaction products of the second component can be made by simultaneous reaction of excess 1-isocyanato-3-isocyanatomethyl-3,5,5-trimethylcyclohexane and the mixture of polyols. Alternatively, the diisocyanate can be reacted with part or all of one or more of the polyols prior to the reaction with the remaining portion of these materials. Stepwise mixing of the diisocyanate with the polyols or water may be used to enhance temperature control. The reaction temperature for making the various urethane prepolymers of this second component are often in the range of about 40° to 150° C., with about 90° to 130° C. being preferred; and the reaction is preferably continued until there is essentially little, if any, unreacted hydroxyl functionality remaining. Catalysts may also be used in forming the prepolymers to accelerate the rate of reaction. Typical catalysts include organo-tin compounds, for example, dibutyltin dilaurate and stannous octoate may be used. Other useful catalysts include tertiary aliphatic and alicyclic amines, such as triethylamine, triethanolamine, tri-n-butyamine, triethylene diamine, alkyl morpholines and the like.

The prepolymer of this second component can be prepared in the presence of an essentially inert solvent. The solvent serves to insure that the reactants are in the liquid state and the solvent permits better temperature control during the reaction by serving as a heat sink and, if desired, as a refluxing medium. Various solvents including mixtures of such materials may be employed and among the useful organic solvents are the aliphatic and aromatic hydrocarbons, esters, ethers, keto-esters, ketones, glycol-ether-esters, chlorinated hydrocarbons, and the like, and mixtures thereof.

Isocyanate-terminated polyurethane prepolymers of the above-described type are known in the art as disclosed in U.S. Pat. No. 3,549,569 to Farah et al. and are commercially available. A particularly preferred prepolymer of this type for use in the compositions of the instant invention is commercially available from the Spencer-Kellogg Company under the designation Spenlite P2560CX.

For a more detailed description of the above-described isocyanate-terminated polyurethane prepolymers and their method of preparation, see the aforementioned U.S. Pat. No. 3,549,569 to Farah et al., incorporated herein by reference.

The coating compositions of the invention may contain from about 2 percent to about 60 percent, preferably from 5 to 15 percent by weight of total resin solids of this second prepolymer component.

The third essential component (3) of the compositions of the invention is a polyketimine material formed by reacting a diketimine having the general formula:

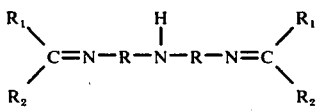

wherein R is an alkylene group of 2 to 6 carbon atoms and $R_1$ and $R_2$ are hydrogen or organic radicals having from 1 to 8 carbon atoms, such as alkyl or aryl and a polyisocyanate material selected from the group consisting of an isocyanate-terminated polyurethane prepolymer formed by reacting an organic diisocyanate and an organic diol at an NCO/OH ratio of from about 2:1 to about 4:3 or a mixture of an isocyanate-terminated prepolymer and unreacted organic diisocyanate formed by reacting an organic diisocyanate and an organic diol at an NCO/OH ratio of from about 3:1 to about 5:1. Various diketimines as represented by the above structural formula are available commercially such as, for example, diethylenetriamine methylisobutyl diketimine. Generally these diketimines are prepared by reacting an alkylene polyamine and a carbonyl compound having the structure:

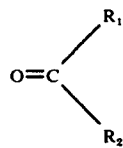

wherein $R_1$ and $R_2$ are hydrogen or organic radicals substantially inert to the ketimine formation reaction. It is preferred that one of these radicals be an organic group. Preferably $R_1$ and $R_2$, when organic, are short chain alkyl groups (1 to 4 carbon atoms). Preferred examples of the carbonyl compounds include ketones such as acetone, methyl ethyl ketone, methyl isobutyl ketone, methyl n-butyl ketone, methyl t-butyl ketone, ethyl isopropyl ketone, and the like. The branched chain ketones, such as diisobutyl ketone, diisopropyl ketone and methyl t-butyl ketone are particularly preferred in that they produce ketimines having excellent stability and improved potlife.

As indicated, the polyketimine material of this component is prepared by reacting the above-described diketimines with a polyisocyanate material which is selected from the group consisting of an isocyanate-terminated prepolymer formed by reacting an organic diisocyanate and an organic diol at an NCO/OH ratio of from about 2:1 to about 4:3 or a mixture of an isocyanate-terminated prepolymer and unreacted organic diisocyanate formed by reacting an organic diisocyanate and an organic diol at an NCO/OH ratio of from about 3:1 to about 5:1. As will be apparent from the above, the term "polyketimine material" employed herein refers not only to a specific polyketimine compound but also to a mixture of polyketimine compounds.

Organic diisocyanates and organic diols employed in forming such prepolymers or mixtures of prepolymers and unreacted diisocyanates may be any of those previously described. Thus, the organic diisocyanate may be essentially any organic diisocyanate such as a hydrocarbon diisocyanate, a substituted hydrocarbon diisocyanate, an aromatic, aliphatic or cycloaliphatic diisocyanate or combination of these types, while the organic diol may be a polyether diol, a polyester diol or a mixture of such diols. However, for purposes of this invention it is preferred to employ an isocyanate-terminated prepolymer or mixture of prepolymer and unreacted diisocyanate derived from isophorone diisocyanate or 2,4-toluene diisocyanate and the polycaprolactone diol designated Niax PCP-0200 described above.

It should be recognized that the diisocyanates described under component (1) may closely approximate the molecules theoretically formed by the ratio of ingredients used. However, depending upon the diisocyanate monomer used, the diol prepolymer used and/or the reaction conditions, the diisocyanates of component (1) may contain a combination of higher molecular weight prepolymer molecules and, therefore, unreacted diisocyanate monomer as the reactive species. The preferred isocyanate monomers, isophorone diisocyanate and 2,4-toluene diisocyanate, and lower reasonable reaction conditions tend to favor the theoretical structures and the lowest free isocyanate monomer contents. They are safer to handle from a vapor toxicity standpoint.

Similarly, the tetraketimines derived from isocyanate functional prepolymers as described in component (3) may be relatively close approximations of the molecules formed by the addition of their ingredients as presented. However, tetraketimines derived from component (1) type materials which contain free diisocyanate monomer and all tetraketimines derived from isocyanate functional prepolymers prepared with excess diisocyanate monomer added intentionally to obtain lower isocyanate equivalent weights will be mixtures of tetraketimine functional prepolymers and the adducts of diisocyanate monomer with two moles of reactive diketimine. Therefore, in agreement with the objective to produce lower cost polyurea polyurethane coatings, there may be considerable variation in components (1) and (3) not at all obvious from considerations of the chemicals used and how they are put together, but entirely useful in the preparation of low energy cure two-package coatings.

The reaction between the above-described diketimines and polyisocyanate compounds (i.e., the prepolymer or prepolymer-diisocyanate mixture) is generally quite fast and exothermic. Since ketimines can react with isocyanates directly, even in the absence of moisture, temperatures below about 110° F. should be employed in the reaction. The polyketimine material formed by the reaction of such diketimine and said prepolymer or prepolymer-diisocyanate mixture contains no free NCO groups. Accordingly, in the reaction mixture an NCO:NH ratio of 1:1 is ordinarily employed.

In preparing the polyketimine material herein the reaction may be carried out in non-reactive solvents such as aliphatic or aromatic hydrocarbons or acetates. Specific examples include xylene, toluene, Cellosolve acetate and the like.

The compositions of the invention may contain from about 20 percent to about 50 percent, preferably from 30 to 40 percent by weight of total resin solids of the polyketimine material.

The compositions of the invention in addition to the two prepolymer components and the polyketimine material may contain various other additives conventionally employed in coating compositions. Thus, the composition may contain pigments, dispersing aids, surface active agents, wetting agents, flow agents, fungicides, antioxidants, ultraviolet absorbers and the like. When it is desired to produce pigmented compositions, the pigment may be added in conventional manner to either of the prepolymer components or to the polyketimine compound. Pigments which may be employed include titanium dioxide, carbon black, talc, barytis, zinc sulfate, strontium chromate, barium chromate and the like, as well as color pigments such as cadmium yellow, cadmium red, toluene red, and the like.

The compositions of the invention may be moisture-cured, or moisture and heat cured, depending on the properties desired and the particular substrate employed. In some cases, depending on the specific composition employed, the composition may be heat cured alone.

The compositions can be applied to various substrates such as metal, wood, concrete and the like by techniques well known in the art, such as reverse and direct roll coating, air spray, dipping, flow coating and the like.

The compositions of this invention are particularly useful as coatings on wood, particularly wood millwork, because of their ability to cure by reaction with moisture and at low temperatures and their outstanding durability as well as other excellent properties.

The following examples set forth specific embodiments of the instant invention. However, the invention is not to be construed as being limited to these embodiments for there are, of course, numerous possible variations and modifications.

All parts and percentages in the examples as well as throughout the specification are by weight unless otherwise indicated.

EXAMPLE A

This example illustrates the preparation of a first isocyanate terminated prepolymer component of the compositions of the invention.

Into a reactor equipped with a thermometer, a reflux condenser, dropping funnel, nitrogen inlet and a mechanical stirrer which was previously sparged with nitrogen for 30 minutes, where charged 85.5 parts of xylene, 85.5 parts of Cellosolve acetate, 318.0 parts (1.2 equivalents) of an epsiloncaprolactone diethylene glycol addition product wherein the ratio of lactone units to molecules of glycol is 3.7 to 1.0, and 200.0 (1.8 equivalents) parts of isophorone diisocyanate. The reaction mixture was heated to 200° F. over a period of about 30 minutes. The reactants were then maintained at a temperature of from 195° to 205° F. over a period of 5 hours. Thereafter, the isocycanate-terminated prepolymer was cooled.

The isocyanate-terminated prepolymer had the following properties:

| | |
|---|---|
| Percent solids | 74.9 |
| Viscosity (Gardner-Holdt) | W–X |
| Color | <1 |
| NCO equivalent | 1091 |

EXAMPLE B

This example illustrates the preparation of a polyketimine component of the compositions of the invention in which a diketimine was reacted with a mixture of prepolymer and unreacted diisocycanates.

Into a reactor previously sparged with dry nitrogen for 30 minutes and equipped with a thermometer, a reflux condenser, dropping funnel, nitrogen inlet, and a mechanical stirrer were charged 1675 parts if isophorone diisocyanate (15.1 equivalents), 1333 parts of an epsilon-caprolactone diethylene glycol addition product (5 equivalents) wherein the ratio of lactone to the molecules of glycol is 3.7 to 1.0, and 894 parts of methyl isobutyl ketone. The reaction mixture was heated to 200° F. over 30 minutes and the reaction mixture was held for 5 hours at a temperature of from 200° to 205° F. After this period, the reaction mixture was cooled to 100° F. with an ice bath. Then 3598 parts of diethylenetriamine methyl isobutyl ketone diketimine 72 percent in excess methyl isobutyl ketone (10 equivalents of NH) were added dropwise over a one hour period while maintaining the temperature below 110° F. and the mixture held for ½ hour. The resultant polyketimine solution was analyzed by infrared and showed substantially no unreacted isocyanate absorption. The polyketimine had the following properties:

| | |
|---|---|
| Amine equivalent (theoretical 377) on solution | 374 |
| Ketimine content (percent) - theoretical | 75 |
| Viscosity (Gardner-Holdt) | S–T |
| Color (Gardner) | 5 |
| Functionality/molecule (theoretical) | 4 |

EXAMPLE C

This example illustrates the preparation of a polyketimine material in which the diketimine is reacted with the prepolymer above.

Into a reactor purged with nitrogen and equipped with a thermometer, a reflux condenser, dropping funnel, nitrogen inlet, and a mechanical stirrer were charged 392.0 parts of 2,4-toluene diisocyanate (4.5 equivalents) and 392.0 parts of urethane grade Cellosolve acetate. The mixture was heated to 100° F. and then 795.0 parts (3 equivalents) Niax PCP-0200 (an epsilon-caprolactone diethylene glycol addition product in which the ratio of lactone to molecules of glycol is 3.7 to 1.0), and 795.0 parts of urethane grade Cellosolve acetate were added dropwise over a period of about 30 minutes (note the NCO/OH ratio above is 3:2). Then an additional 243.0 parts of urethane grade Cellosolve acetate were added as a rinse. The reaction mixture was held for 1 hour at about 105° F. and then heated to 150° F. and held for 3 hours. At this point, the reaction mixture was cooled to 80° F. and then 536.0 parts of a 72 percent diethylenetriamine methyl isobutyl ketone diketimine in excess methyl isobutyl ketone (1.5 equivalents of NH) were added over a period of about 30 minutes.

The resultant polyketimine solution was analyzed by infrared and showed no unreacted isocyanate absorption. The polyketimine had the following properties:

| | |
|---|---|
| Amine equivalent (theoretical 1058) on solution | 1034 |
| Ketimine content (percent) theoretical | 50 |
| Viscosity (Gardner-Holdt) | S-T |
| Color (Gardner) | 3+ |
| Functionality/molecule (theoretical) | 4 |

EXAMPLE I

This example illustrates the preparation and properties of a coating composition of the invention. In this example, a coating composition pigmented with titanium dioxide at a pigment-to-binder ratio of 1:1 was prepared utilizing standard paint mixing procedures by blending 885 parts (0.77 equivalent) of the prepolymer of Example A, 183 parts (0.33 equivalent) of Spenlite P-2560CX prepolymer (a prepolymer available from the Spencer-Kellogg Company consisting of the reaction product of 1-isocyanato-3-isocyanatoethyl-3,5,5-trimethylcyclohexane and a mixture of aliphatic polyols wherein at least 30 mole percent of the hydroxyl groups in the mixture are supplied by a polyol having at least 3 hydroxyl groups, said prepolymer having an NCO/OH ratio of at least 1.2:1, an available percent NCO of 7.6, a Gardner-Holdt viscosity of V and a solids content of about 60 percent), 374 parts (1.0 equivalent) of the polyketimine of Example B and 1044 parts of titanium dioxide. The resultant coating composition was spray applied on metal and wood panels (treated with a pentachlorophenol-based naphtha thinned preservative solution that was allowed to dry for from 2–24 hours), allowed to moisture cure in the ambient atmosphere and the resultant films then subjected to various tests.

The test results were as follows:

| | |
|---|---|
| Tensile strength (p.s.i.)* | 3500–4000 |
| Elongation (percent)* | 60–80 |
| Gloss (60° photovolt) | 85 |
| Impact resistance (in lbs.)** | |
| Forward | 160 |
| Reverse | 160 |
| Flexibility retention*** after 1500 hours weather-o-meter | 10% |
| Sprayable potlife | 2–4 hours |

*2.5 mil film cured 7 days in ambient atmosphere.
**Coating applied to iron phosphated steel panels.
***Initial elongation of 70 percent dropped to 10 percent after 1500 hours weather-o-meter. Note that this is still better than the elongation of wood itself.

It should be noted that the above composition cured to handle at ambient temperature and 50% relative humidity in less than 1 hour or after a cure of 10 minutes at 120° F. or 5–8 minutes at 80° F. and 80% relative humidity. In contrast, prior polyurea systems cured to handle in greater than 2 hours or often didn't cure at all, remaining tacky and soft. This is especially true if the wood is very porous due to bacterial decay and retains much of the hydrocarbon solvents in the preservative treating solution.

EXAMPLE II

This example illustrates the preparation and properties of an additional coating composition of the invention. In the example, a pigmented composition having a pigment-to-binder ratio of 1:1 was prepared in substantially the same manner as in Example I, by blending 885 parts (0.77 equivalent) of the prepolymer of Example A, 183 parts (0.33 equivalent) of Spenlite P-2560CX prepolymer, 1034 parts of the polyketimine of Example C and 1044 parts of titanium dioxide. The resultant composition was spray applied, cured and tested as in Example I. Test results were as follows:

| | |
|---|---|
| Tensile strength (p.s.i.) | 3000–4000 |
| Elongation (percent) | 60–120 |
| Gloss (60° photovolt) | 85 |
| Impact resistance (in lbs.) | |
| Forward | 160 |
| Reverse | 160 |
| Flexibility retention after 1500 hours weather-o-meter | 10% |

As the above results indicate, the compositions of the invention produce coatings having outstanding durability as well as other excellent properties.

According to the provisions of the Patent Statutes, there has been described above the invention and what are now considered to be its best embodiments. However, within the scope of the appended claims, it is to be understood that the invention can be practiced otherwise than as specifically described.

We claim:
1. A coating composition comprising:
  A. from about 2 percent to about 80 percent by weight of resin solids of an isocyanate-terminated polyurethane prepolymer consisting essentially of the reaction product of an organic diisocyanate and an organic diol, wherein said prepolymer is prepared at an NCO/OH ratio of from about 2:1 to about 4:3;
  B. from about 2 percent to about 60 percent by weight of resin solids of an isocyanate-terminated polyurethane prepolymer consisting essentially of the reaction product of 1-isocyanato-3-isocyanatomethyl-3,5,5-trimethylcyclohexane and a mixture of aliphatic polyols, wherein said prepolymer is prepared at an NCO/OH ratio of at least 1.2:1 and wherein at least about 30 mole percent of the total hydroxyl groups supplied by said mixture of polyols is supplied by an aliphatic polyol having at least three hydroxyl groups; and
  C. from about 20 percent to about 50 percent by weight of resin solids of a polyketimine material consisting essentially of the reaction product of a diketimine compound having the general formula:

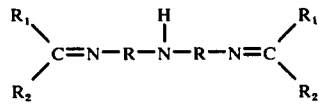

wherein R is an alkylene group of 2 to 6 carbon atoms and $R_1$ and $R_2$ are hydrogen or organic radicals having from 1 to 8 carbon atoms, and a polyisocyanate material selected from the group consisting of an isocyanate-terminated prepolymer formed by reacting an organic diisocyanate and an organic diols at an NCO- /OH ratio of from about 2:1 to about 4:3 or a mixture of an isocyanate-terminated prepolymer and unreacted organic diisocyanate formed by reacting an organic diisocyanate and an organic diol at an NCO/OH ratio of from about 3:1 to about 5:1, and wherein a sufficient amount of said diketimine is reacted with said prepolymer or said mixture to produce a polyketimine material containing no free NCO groups.

2. The coating composition of claim 1 wherein the organic diisocyanate of prepolymer (A) is selected from the group consisting of hydrocarbon diisocyanates, substituted hydrocarbon diisocyanates, aromatic diisocyanates, aliphatic diisocyanates, and cycloaliphatic diisocyanates.

3. The coating composition of claim 1 wherein the organic diisocyanate of prepolymer (A) is isophorone diisocyanate or 2,4-toluene diisocyanate.

4. The coating composition of claim 1 wherein the organic diol of prepolymer (A) is selected from the group consisting of polyester diols, polyether diols or mixtures thereof.

5. The coating composition of claim 1 wherein the organic diol of prepolymer (A) is a polyester diol of diethylene glycol and epsilon-caprolactone havng a rate of 3.7 lactone units per molecule of glycol.

6. The coating composition of claim 1 wherein said prepolymer of (A) is prepared at an NCO/OH ratio of 3:2.

7. The coating composition of claim 1 wherein the mixture of aliphatic polyols of prepolymer (B) may be a mixture of diols, triols, ester polyols or ether polyols.

8. The coating composition of claim 1 wherein the prepolymer of (B) is the reaction product of 1-isocyanato-3-isocyanatomethyl-3,5,5-trimethylcyclohexane, trimethylolpropane and neopentyl glycol.

9. The coating composition of claim 1 wherein the prepolymer of (B) contains from 3 to 25 percent of free isocyanate groups.

10. The coating composition of claim 1 wherein the diketimine of (C) is diethylenetriamine methyl isobutyl ketone diketimine.

11. The coating composition of claim 1 wherein the diketimine of (C) is diisobutyl ketone diketimine.

12. The coating composition of claim 1 wherein the polyisocyanate material employed in forming the polyketimine material of (C) is an isocyanate-terminated prepolymer prepared at an NCO/OH ratio of 3:2.

13. The coating composition of claim 12 wherein said prepolymer consists essentially of the reaction product of isophorone diisocyanate or 2,4-toluene diisocyanate and a polyester diol of diethylene glycol and epsilon-caprolactone having a ratio of 3.7 lactone units per molecule of glycol.

14. The coating composition of claim 1 wherein the polyisocyanate material employed in forming the polyketimine material of (C) is a mixture of an isocyanate-terminated prepolymer and unreacted organic diisocyanate formed by reacting isophorone diisocyanate or 2,4-toluene diisocyanate and a polyester diol of diethylene glycol and epsilon-caprolactone having a ratio of 3.7 lactone units per molecular of glycol at an NCO/OH ratio of from about 3:1 to about 5:1.

15. The coating composition of claim 14 wherein said mixture is prepared at an NCO/OH ratio of 3:1.

16. A method of preparing a polyurea-urethane coating comprising the steps of:

A. preparing an isocyanate-terminated polyurethane prepolymer consisting essentially of the reaction product of an organic diisocyanate and an organic diol, said prepolymer being prepared at an NCO-/OH ratio of from about 2:1 to about 4:3;

B. preparing an isocyanate-terminated prepolymer consisting essentially of the reaction of 1-isocyanato-3-isocyanatomethyl-3,5,5-trimethylcyclohexane and a mixture of aliphatic polyols, wherein said prepolymer is prepared at an NCO-/OH ratio of at least 1.2:1, and wherein at least about 30 mole percent of the total hydroxyl groups supplied by said mixture of polyols is supplied by an aliphatic polyol having at least three hydroxyl groups;

C. preparing a polyketimine material consisting essentially of the reaction product of a diketimine compound having the general formula:

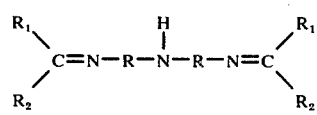

wherein R is an alkylene group of 2 to 6 carbon atoms and $R_1$ and $R_2$ are hydrogen or organic radicals having from 1 to 8 carbon atoms, an a polyisocyanate material selected from the group consisting of an isocyanate-terminated prepolymer formed by reacting an organic diisocyanate and an organic diol at an NCO/OH ratio of from about 2:1 to about 4:3 or a mixture of an isocyanate-terminated prepolymer and unreacted organic diisocyanate formed by reacting an organic diisocyanate and an organic diol at an NCO/OH ratio of from about 3:1 to about 5:1, and wherein a sufficient amount of said diketimine is reacted with said prepolymer or said mixture to produce a polyketimine material containing no free NCO groups;

D. blending from about 2 percent to about 80 percent by weight of resin solids of the prepolymer of step (A), from about 2 percent to about 60 percent by weight of resin solids of the prepolymer of step (B), and from about 20 percent to about 50 percent by weight of the polyketimine material of step (C) to form a coating composition;

E. applying said coating composition to a substrate; and

F. curing said applied coating composition to provide a polyureaurethane coating on said substrate.

17. The method of claim 16 wherein the organic diisocyanate employed in forming the prepolymer in step (A) is isophorone diisocyanate or 2,4-toluene diisocyanate.

18. The method of claim 16 wherein the organic diol employed in forming the prepolymer of step (A) is a polyester diol of diethylene glycol and epsilon-caprolactone having a ratio of 3.7 lactone units per molecule of glycol.

19. The method of claim 16 wherein the prepolymer of step (A) is prepared at an NCO/OH ratio of 3:2.

20. The method of claim 16 wherein the mixture of aliphatic polyols employed in preparing the prepolymer of step (B) is a mixture of diols, triols, ester polyols or ether polyols.

21. The method of claim 16 wherein the prepolymer of step (B) is prepared by reacting 1-isocyanato-3- isocyanatomethyl-3,5,5-trimethylcyclohexane, trimethylol propane and neopentyl glycol.

22. The method of claim 16 wherein the diketimine employed in preparing the polyketamine material of step (C) is diethylenetriamine methyl isobutyl ketone diketimine.

23. The method of claim 16 wherein the diketimine employed in preparing the polyketamine material of step (C) is diisobutyl ketone diketamine.

24. The method of claim 16 wherein the polyisocyanate material employed in preparing the polyketamine material of step (C) is an isocyanate-terminated prepolymer prepared at an NCO/OH ratio of 4:3.

25. The method of claim 24 wherein said prepolymer consists essentially of the reaction product of isophorone diisocyanate or 2,4-toluene diisocyanate and a polyester diol of diethylene glycol and epsilon-caprolactone having a ratio of 3.7 lactone units per molecule of glycol.

26. The method of claim 16 wherein the polyisocyanate material employed in preparing the polyketimine material of step (C) is a mixture of an isocyanate-terminated prepolymer and unreacted organic diisocyanate formed by reacting isophorone diisocyanate or 2,4-toluene diisocyanate and a polyester diol of ethylene glycol and epsilon-caprolactone having a ratio of 3.7 lactone units per molecule of glycol at an NCO/OH ratio of from about 3:1 to about 5:1.

27. The method of claim 16 wherein the curing of step (F) is moisture curing.

28. The method of claim 16 wherein the curing of step (F) is moisture and heat curing.

* * * * *